US012454141B2

(12) United States Patent
Kobayashi

(10) Patent No.: US 12,454,141 B2
(45) Date of Patent: Oct. 28, 2025

(54) PRINTING DEVICE

(71) Applicant: BROTHER KOGYO KABUSHIKI KAISHA, Nagoya (JP)

(72) Inventor: Akihito Kobayashi, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 178 days.

(21) Appl. No.: 18/418,762

(22) Filed: Jan. 22, 2024

(65) Prior Publication Data

US 2024/0278587 A1 Aug. 22, 2024

(30) Foreign Application Priority Data

Feb. 22, 2023 (JP) ................................ 2023-025970

(51) Int. Cl.
*B41J 11/00* (2006.01)
*B41J 2/21* (2006.01)
*B41J 11/06* (2006.01)

(52) U.S. Cl.
CPC ....... *B41J 11/00222* (2021.01); *B41J 2/2103* (2013.01); *B41J 11/06* (2013.01)

(58) Field of Classification Search
CPC .... B41J 11/00222; B41J 2/2103; B41J 11/06; B41J 11/0015
See application file for complete search history.

(56) References Cited

U.S. PATENT DOCUMENTS

2019/0283458 A1 9/2019 Ohnishi
2022/0097433 A1 * 3/2022 Kawakita ............... B41J 2/1714

FOREIGN PATENT DOCUMENTS

JP 2019155726 A 9/2019

* cited by examiner

*Primary Examiner* — Bradley W Thies
(74) *Attorney, Agent, or Firm* — K&L Gates LLP

(57) ABSTRACT

A printing device includes a head including a nozzle configured to eject ink, a housing in which the head is disposed, a platen configured to support a printing medium applied with a pretreatment liquid, the pretreatment liquid containing a volatile component that reacts with the ink, a humidifying mechanism configured to supply humidified air to inside of the housing, an air-blowing mechanism configured to blow air from the inside of the housing toward outside of the housing, and a controller configured to control the humidifying mechanism and the air-blowing mechanism. The controller is configured to drive the air-blowing mechanism, at least after driving the humidifying mechanism.

8 Claims, 12 Drawing Sheets

PRINTING DEVICE

REFERENCE TO RELATED APPLICATIONS

This application claims priority from Japanese Patent Application No. 2023-025970 filed on Feb. 22, 2023. The entire content of the priority application is incorporated herein by reference.

BACKGROUND ART

A related art discloses a printing device including an inkjet head configured to eject color ink. In the printing device, a liquid pretreatment agent is evaporated before color ink is ejected onto a printing medium applied with the pretreatment agent and then the color ink is ejected. As a result, drying of the pretreatment agent can be appropriately accelerated before the color ink is ejected.

However, in the printing device described in the related art, in a case where the pretreatment agent applied to the printing medium is volatilized during printing, the volatile component may react with the ink in a nozzle of the inkjet head. Due to the reaction between the ink and the volatile component of the pretreatment agent, there is a problem that the ink in the nozzle may aggregate, resulting in an ejection failure or color change of the ink.

Considering the above problem, the inventors of the present disclosure have studied supplying humidified air to the inside of a housing in which the inkjet head is disposed. As a result, the volatile component of the pretreatment agent applied to the printing medium placed on a platen is less likely to reach the ink in the nozzle, and the reaction between the ink and the volatile component can be reduced.

However, the humidified air supplied to the inside of the housing increases the humidity inside the housing. In a case where the inside of the housing is in a high-humidity environment, dew condensation may occur on the electrical components located inside the housing. As a result, there is a problem that malfunction occurs in the printing device.

SUMMARY

An object of the present disclosure is to provide a printing device capable of preventing a failure due to a reaction between ink in a nozzle and a volatile component of a pretreatment liquid, and of preventing dew condensation from occurring inside a housing.

A printing device according to the present disclosure includes a humidifying mechanism configured to supply humidified air to inside of the housing, an air-blowing mechanism configured to blow air from the inside of the housing toward outside of the housing, and a controller configured to control the humidifying mechanism and the air-blowing mechanism. The controller is configured to drive the air-blowing mechanism, at least after driving the humidifying mechanism.

DESCRIPTION

A printing device 1 of the present disclosure will be described with reference to the drawings. In the following description, an up-down direction and a front-rear direction are defined based on a state (state in FIG. 1) where the printing device 1 is installed to be usable. A left-right direction is defined when the printing device 1 is viewed from the front. In the following description, the left-right direction may be referred to as a horizontal scan direction, and the front-rear direction may be referred to as a vertical scan direction.

Figure 1:
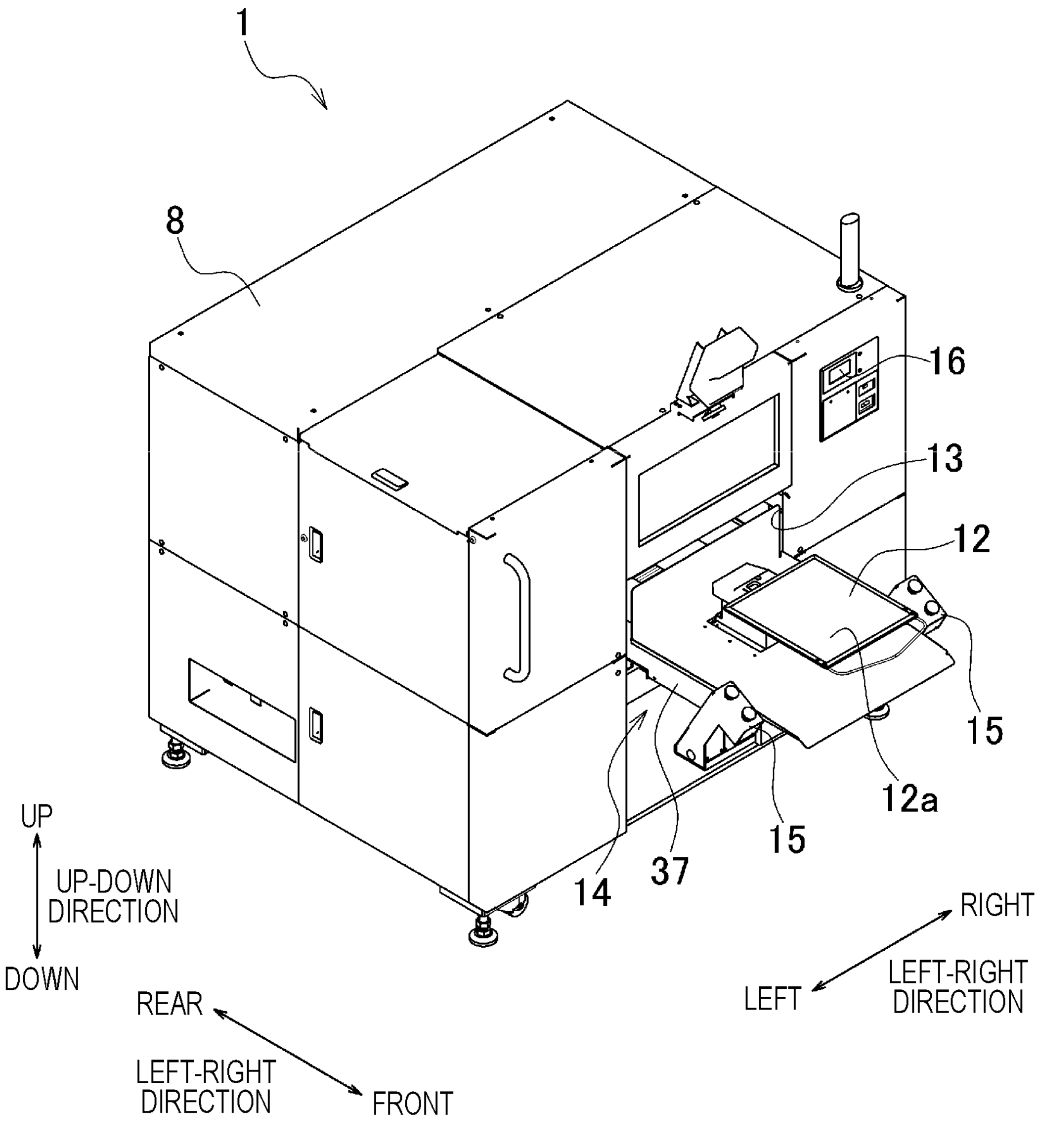
FIG. 1 is a schematic perspective view of a printing device.

The printing device 1 shown in FIG. 1 is an inkjet printer. The printing device 1 is configured to eject ink onto a printing medium to perform printing. The printing device 1 is configured to print a color image on the printing medium using five colors of ink of white, black, yellow, cyan, and magenta. The printing medium is not particularly limited as long as an image can be formed by ejecting ink, and examples thereof include fabric and paper. In the present embodiment, the printing medium is, for example, a T-shirt containing polyester fibers. In a case where the printing device 1 prints on the printing medium (T-shirt), the printing medium to which a pretreatment liquid is applied in advance is placed on a platen 12. The pretreatment liquid reacts with the ink ejected onto the pretreatment liquid to agglomerate components of the ink, thereby preventing the occurrence of bleeding. A volatile component of the pretreatment liquid contains an organic acid such as formic acid.

Hereinafter, the white ink among the five colors of ink is referred to as "white ink". Among the five colors of ink, when four colors of ink of black, cyan, yellow, and magenta are collectively referred to, or when any of the four colors of ink is not specified, the four colors of ink are referred to as "color ink". When the white ink and the color ink are collectively referred to, or when neither the white ink nor the color ink is specified, the white ink and the color ink are simply referred to as "ink". The white ink is used in printing as a part of an image representing a white color or as a base of the color ink. The color ink is ejected onto the base made of the white ink and used for printing a color image.

Figure 2:
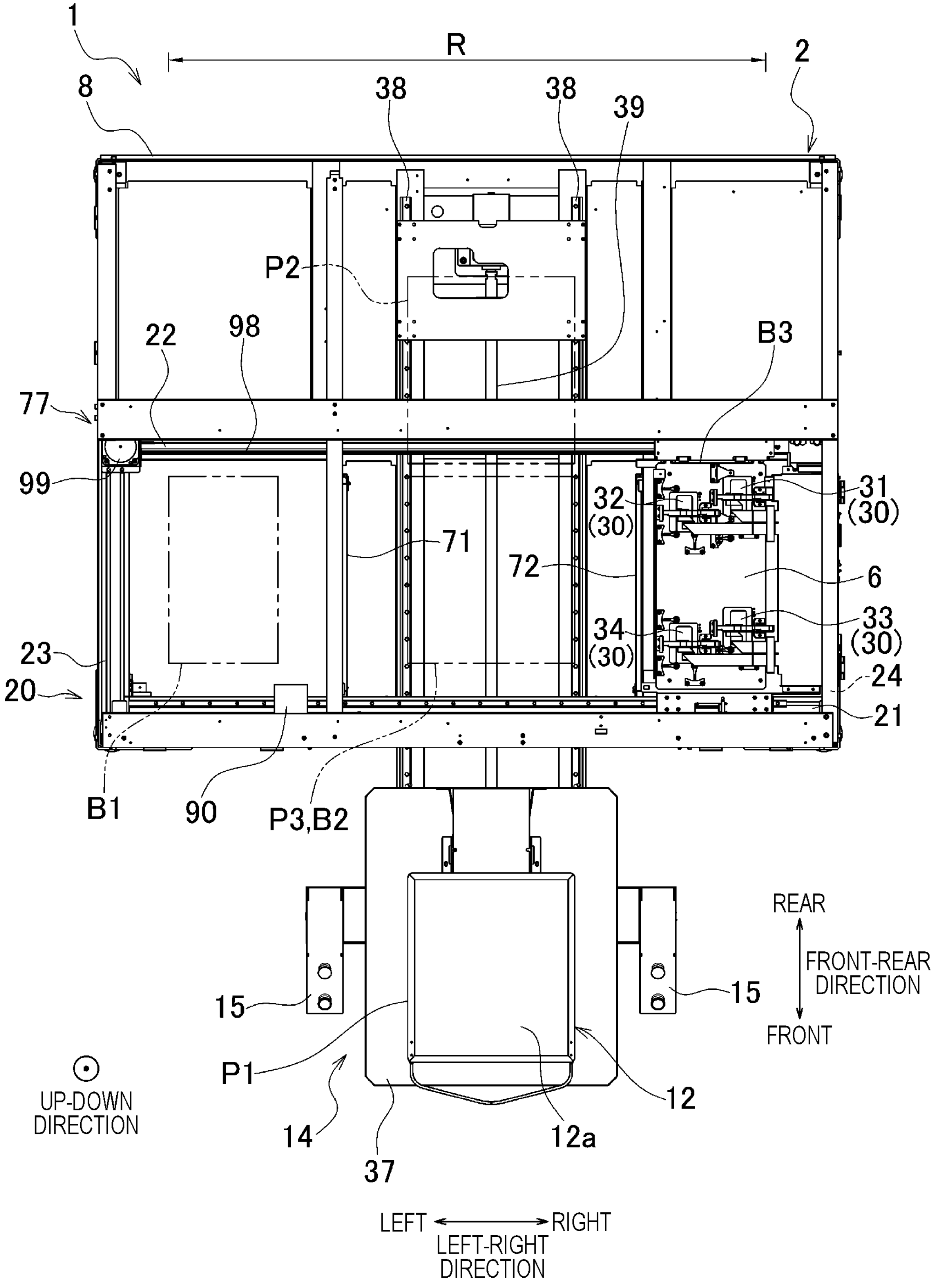
FIG. 2 is a plan view showing an internal structure of the printing device shown in FIG. 1.

An external configuration of the printing device 1 will be described with reference to FIGS. 1 to 3. As shown in FIG. 1, the printing device 1 includes a housing 8, the platen 12, a conveying mechanism 14, operation units 15, and a display screen 16. The housing 8 has a substantially rectangular parallelepiped shape. A rectangular platen opening 13 is formed in substantially the center, in the left-right and up-down directions, of a front surface of the housing 8. Five cartridges (not shown) in which the five colors of ink are stored are accommodated in the housing 8. As shown in FIG. 2, the platen 12 is made of a plate-shaped member having a substantially rectangular planar shape. An upper surface of the platen 12 is a support surface 12*a* configured to support the printing medium. The support surface 12*a* has a quadrangular shape.

The operation units 15 are provided at both left and right end portions of a platen support portion 37 (to be described later) protruding forward from the platen opening 13. The operation unit 15 is configured to output, to a controller 80 to be described later, information corresponding to an operation by a user. The user can input, to the controller 80, a print start command (including print data) for starting printing by the printing device 1, by operating the operation unit 15. The display screen 16 is provided on an upper right side of the platen opening 13 in the front surface of the housing 8. The display screen 16 is configured to display various types of information.

The conveying mechanism 14 is configured to convey the platen 12 on which the printing medium is placed, between the inside and the outside of the housing 8, through the platen opening 13. In a case where the platen 12 is located in a print conveying region P3 (position indicated by two-dot chain line in FIG. 2: "printing position" of present disclosure) inside the housing 8 shown in FIG. 2, ink is ejected from a head 30 to be described later, and printing is performed. As shown in FIG. 2, the conveying mechanism 14 includes the platen support portion 37, a pair of left and right rails 38, a transmission member 39, and a vertical scan motor 26 (see FIG. 8).

Figure 3:
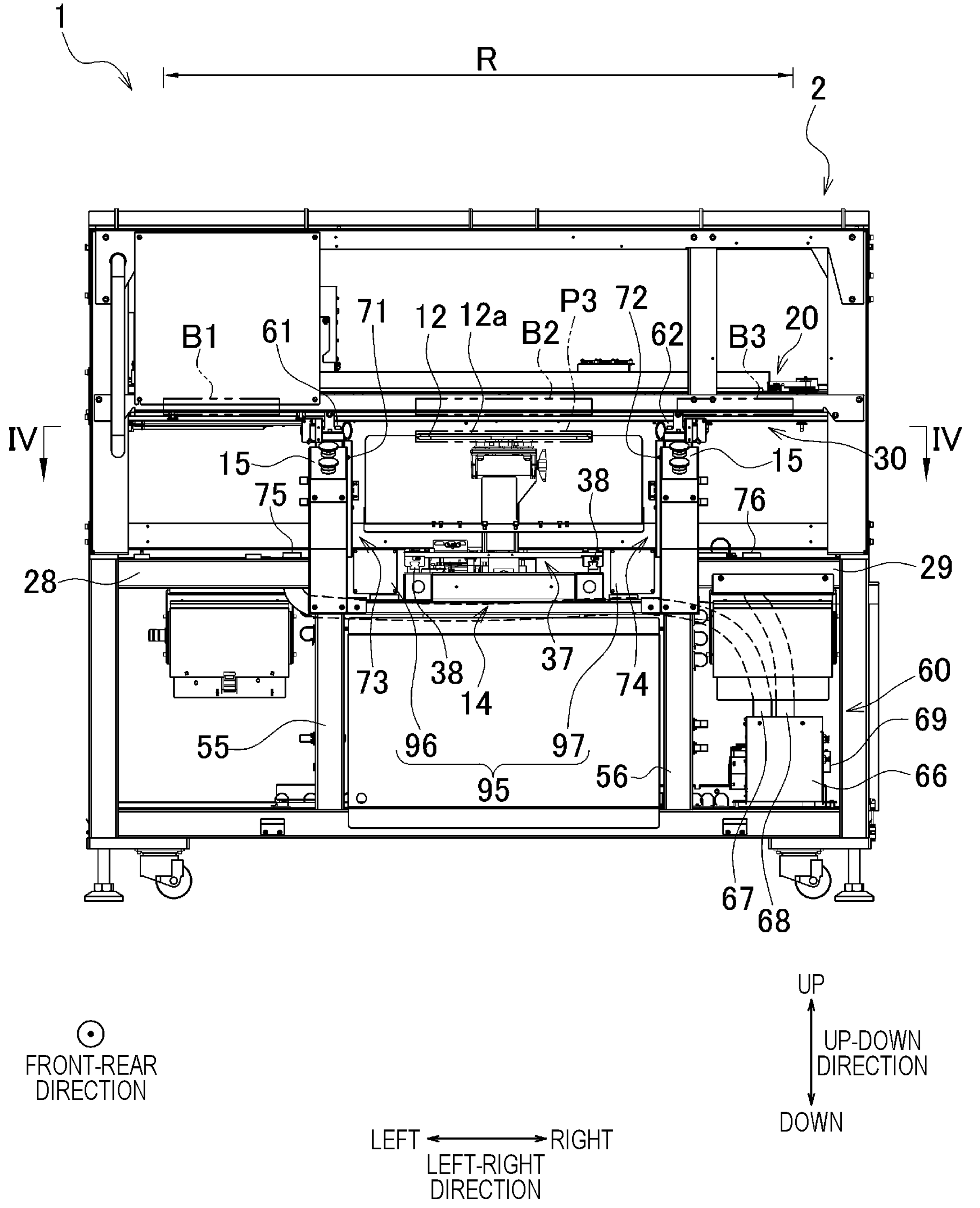
FIG. 3 is a front view showing the internal structure of the printing device shown in FIG. 1.

As shown in FIGS. 2 and 3, the platen support portion 37 is configured to support the platen 12 from below. The pair of left and right rails 38 extend in the front-rear direction, and is configured to support the platen support portion 37 such that the platen support portion 37 moves in the front-rear direction. According to the driving of the vertical scan motor 26, the transmission member 39 is coupled to the platen support portion 37 and the vertical scan motor 26, and is configured to move the platen support portion 37 in the front-rear direction, that is, the vertical scan direction.

An operator places the printing medium on the support surface 12*a* of the platen 12, in a state where the platen 12 is located in front of the front surface of the housing 8, that is, outside the housing 8. The position of the platen 12 shown in FIG. 2 is a setting position P1 at which the printing medium is supported by the platen 12. Before printing on the printing medium, the platen 12 moves from the setting position P1 to a pre-printing standby position P2 (position indicated by two-dot chain line in FIG. 2). The pre-printing standby position P2 is positioned behind the print conveying region P3, and is positioned at a rear end of a conveying path of the platen 12. In the conveying path of the platen 12, the print conveying region P3 is a region that overlaps, in the up-down direction, a movement path of the head 30 in the horizontal scan direction (left-right direction) to be described later. The movement path of the head 30 in the horizontal scan direction is a path between a rear end of the rearmost head 30 (white head 31) and a front end of the foremost head 30 (color head 34).

An internal structure of the printing device 1 will be described with reference to FIGS. 2 to 7. As shown in FIG. 2, the printing device 1 includes, inside the housing 8, a frame 2, a pair of inner walls 71 and 72, partition plates 28 and 29 (see FIG. 3), heads 31 to 34, a moving mechanism 77, suction mechanisms 73 and 74 (see FIG. 3), a humidifying mechanism 60 (see FIG. 3), a humidity sensor 90, and an air-blowing mechanism 95 (see FIG. 3).

Figure 4:
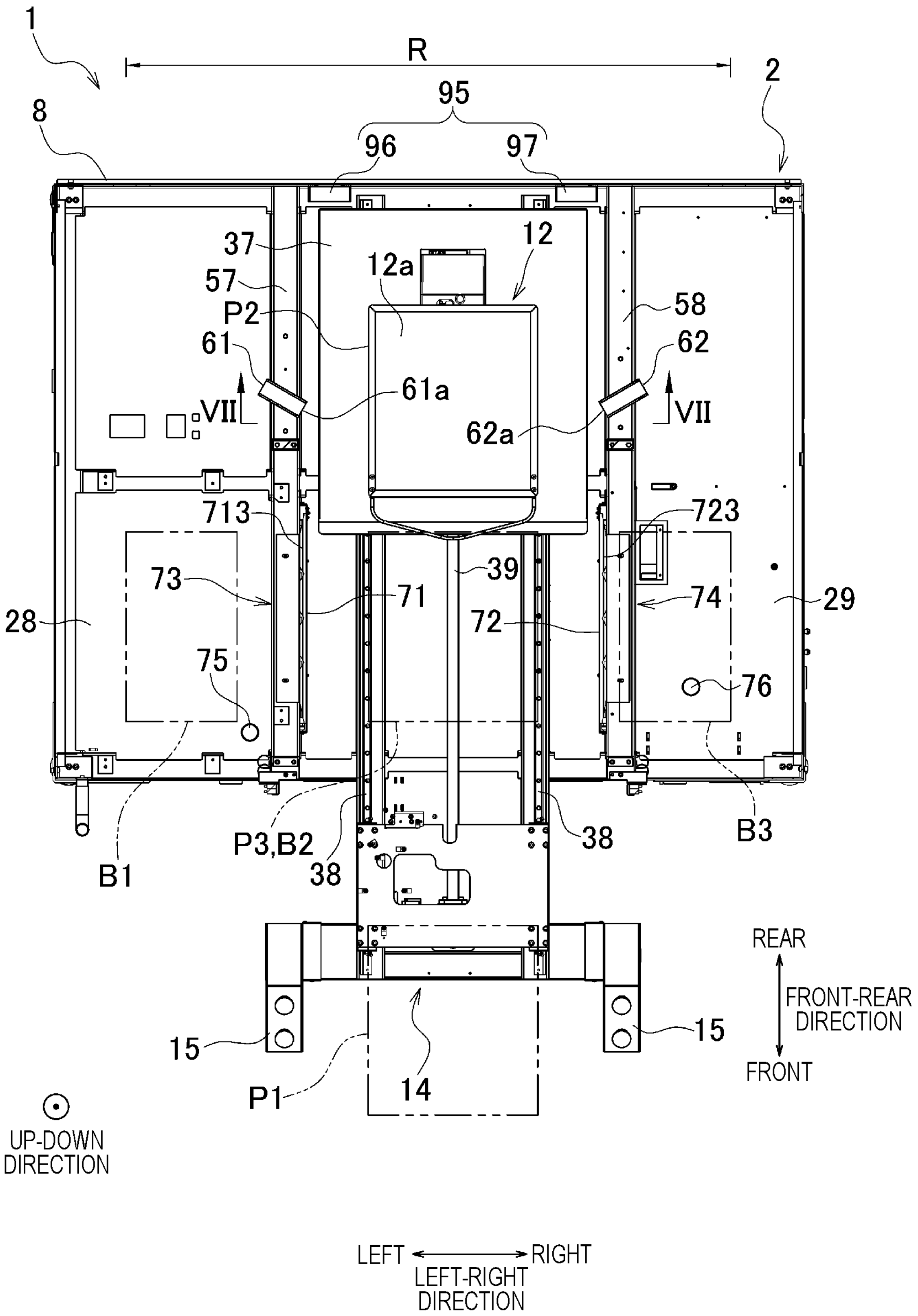
FIG. 4 is a cross-sectional view taken along line IV-IV shown in FIG. 3.

As shown in FIGS. 2 to 4, the frame 2 is formed in a lattice shape by a plurality of shafts extending in the front-rear direction including shafts 57 and 58, a plurality of shafts extending in the left-right direction, and by a plurality of shafts extending in the up-down direction including shafts 55 and 56. The moving mechanism 77 includes a guide shaft 20 fixed to the frame 2 and a carriage 6. As shown in FIG. 2, the guide shaft 20 includes a front shaft 21, a rear shaft 22, a left shaft 23, and a right shaft 24. The conveying mechanism 14 is fixed to the frame 2.

As shown in FIGS. 2 to 4, the pair of inner walls 71 and 72 are disposed separated from each other while facing each other along the left-right direction. For example, as shown in FIG. 2, the pair of inner walls 71 and 72 are disposed to sandwich the conveying path of the platen 12 in the left-right direction, in a plan view. The inner walls 71 and 72 extend in the up-down direction and the front-rear direction below the guide shaft 20, and are fixed to the frame 2. The inner wall 71 is provided to the left of the platen 12 that is entirely located in the print conveying region P3, and is fixed to the shaft 57. The inner wall 72 is provided to the right of the platen 12 that is entirely located in the print conveying region P3, and is fixed to the shaft 58.

As shown in FIGS. 3 and 4, the partition plate 28 is fixed to the frame 2 below the guide shaft 20 and on a left side of the inner wall 71. The partition plate 28 extends along the front-rear direction and the left-right direction. A right end of the partition plate 28 is coupled to a lower end of the inner wall 71.

As shown in FIGS. 3 and 4, the partition plate 29 is fixed to the frame 2 below the guide shaft 20 and on a right side of the inner wall 72. The partition plate 29 extends along the front-rear direction and the left-right direction. A left end of the partition plate 29 is coupled to a lower end of the inner wall 72.

As shown in FIG. 4, a supply port 75 having a circular shape in a plan view and penetrating the partition plate 28 in the up-down direction, is formed in a right front part of the partition plate 28. A supply port 76 having a circular shape in a plan view and penetrating the partition plate 29 in the up-down direction, is formed in a left front part of the partition plate 29. Although a positional relation between the supply port 75 and the supply port 76 is not particularly limited, in the present embodiment, the supply port 75 is formed forward of the supply port 76 in the front-rear direction. Pipes (not shown) are connected to the supply ports 75 and 76 and are connected to humidified air supply pipes 61 and 62 to be described later.

As shown in FIG. 2, the carriage 6 is supported by the front shaft 21 and the rear shaft 22 to be movable in the horizontal scan direction. The carriage 6 has a plate shape and extends in the front-rear and left-right directions. The carriage 6 extends from the front shaft 21 to the rear shaft 22.

Figure 5:
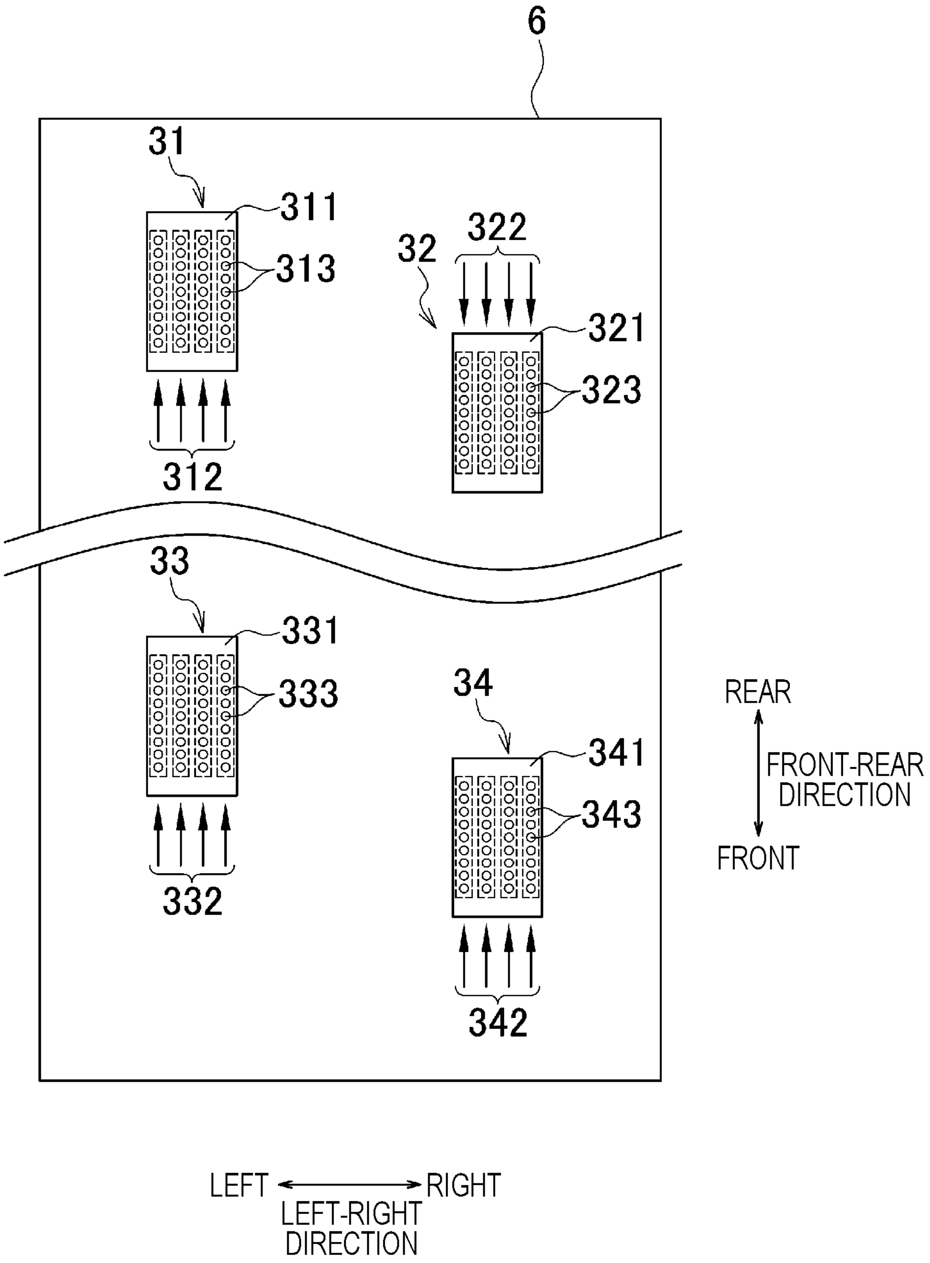
FIG. 5 is a schematic view of a carriage viewed from below.

As shown in FIGS. 2 and 5, the carriage 6 is provided with the white heads 31 and 32, and the color heads 33 and 34. The white heads 31 and 32 and the color heads 33 and 34 configures the "head" of the present disclosure.

The white heads 31 and 32 and the color heads 33 and 34 have the same structure, and have a rectangular parallelepiped shape in the present embodiment. Hereinafter, when the white heads 31 and 32 and the color heads 33 and 34 are collectively referred to, or when neither the white heads 31 and 32 nor the color heads 33 and 34 are specified, the white heads 31 and 32 and the color heads 33 and 34 are referred to as the "head" 30. As shown in FIG. 5, the white heads 31 and 32 are positioned at a rear portion of the carriage 6. The white head 31 is positioned at a right rear portion of the carriage 6. The white head 32 is positioned on a left side of the white head 31, and is displaced to a front side with respect to the white head 31.

As shown in FIGS. 2 and 5, the color heads 33 and 34 are positioned in front of the white heads 31 and 32, in the vertical scan direction. The color heads 33 and 34 are positioned at the same positions as the white heads 31 and 32, in the left-right direction. That is, the color head 34 is positioned on a left side of the color head 33, and is displaced to a front side with respect to the color head 33.

As shown in FIG. 5, a nozzle surface 311 is provided on a lower surface of the white head 31. The nozzle surface 311 extends in the front-rear and left-right directions. A plurality of nozzle rows 312 are formed on the nozzle surface 311. The plurality of nozzle rows 312 are disposed in the left-right direction. Each of the nozzle rows 312 includes a plurality of nozzles 313 disposed in a row at equal intervals in the front-rear direction. The plurality of nozzles 313 are openings, and is configured to eject the white ink downward.

Similarly to the configuration of the white head 31, nozzle surfaces 321, 331, and 341 are provided on lower surfaces of the white head 32 and the color heads 33 and 34, respectively. The nozzle surfaces 321, 331, and 341 extend in the front-rear and left-right directions. A plurality of nozzle rows 322, 332, and 342 are formed on the nozzle surfaces 321, 331, and 341, respectively. The plurality of nozzle rows 322, 332, and 342 are disposed in the left-right direction. The plurality of nozzle rows 322, 332, and 342 include a plurality of nozzles 323, 333, and 343 disposed in a row at equal intervals in the front-rear direction, respectively.

The plurality of nozzles 323 is configured to eject the white ink downward. Different colors of color ink correspond to the respective plurality of nozzle rows 332. That is, the plurality of nozzles 333 is configured to eject the color ink of the colors corresponding to the respective plurality of nozzle rows 332 downward. Different colors of color ink correspond to the respective plurality of nozzle rows 342. The plurality of nozzles 343 is configured to eject the color ink of colors corresponding to the respective plurality of nozzle rows 342 downward.

The moving mechanism 77 includes a drive belt 98 and a horizontal scan motor 99. The drive belt 98 is coupled to a rear end of the carriage 6. The drive belt 98 is provided on the rear shaft 22, and extends in the left-right direction. A left end of the drive belt 98 is coupled to the horizontal scan motor 99. In a case where the horizontal scan motor 99 is driven, the drive belt 98 moves the carriage 6 in the left-right direction along the front shaft 21 and the rear shaft 22. That is, the moving mechanism 77 moves the carriage 6 on which the head 30 is mounted in the horizontal scan direction. FIGS. 2 and 3 show a state in which the carriage 6 is positioned on a right side of a movement range R.

In FIGS. 2 and 3, the movement range R of the head 30 is shown as a maximum range in which the carriage 6 can move in the horizontal scan direction. As shown in FIG. 3, the head 30 is located, by the moving mechanism 77, at any one of a maintenance position B1, an ejection region B2, and a head standby position B3. The maintenance position B1 is at a left side of the movement range R of the head 30, and is a position where the head 30 is maintained by a maintenance unit such as a wiper (not shown) or a cap (not shown). The printing device 1 moves the head 30 to the maintenance position B1 when not printing, and performs maintenance by the maintenance unit. The ejection region B2 is a region between the maintenance position B1 and the head standby position B3 in the horizontal scan direction, and is a region that overlaps, in the up-down direction, the conveying path (print conveying region P3) of the platen 12 in the movement path of the head 30. In a case where the head 30 passes through the ejection region B2 by the carriage 6, the head 30 ejects the ink according to the print data, and printing is performed on the printing medium on the platen 12. The head standby position B3 is at the right side of the movement range R of the head 30, and is a position where the operator performs an operation such as cleaning the head 30. For example, the printing device 1 moves the head 30 to the head standby position B3, and causes the head 30 to stand by, based on an instruction input from the operation unit 15 by a user operation.

The printing device 1 moves the platen 12 in the vertical scan direction by the driving of the vertical scan motor 26 in the print conveying region P3, and moves the carriage 6 in the horizontal scan direction by the driving of the horizontal scan motor 99 in the ejection region B2, and thus the printing medium moves relative to the head 30 in the vertical scan direction and the horizontal scan direction.

An operation of moving the head 30 in the horizontal scan direction and of ejecting the ink onto the printing medium when the head 30 faces the printing medium is referred to as "ejection scan". The printing device 1 is configured to repeat the ejection scan and movement of the platen 12 in the vertical scan direction to perform printing on the printing medium. For example, the printing device 1 is configured to eject the white ink from the white heads 31 and 32 to form a base on the printing medium in the ejection scan. The printing device 1 is configured to eject the color ink from the color heads 33 and 34 onto the base formed on the printing medium in the ejection scan to print a color image.

As shown in FIG. 3, the suction mechanisms 73 and 74 is configured to mainly suck air in the print conveying region P3, in the ejection region B2, and in spaces in the vicinity of these regions. In the horizontal scan direction, the suction mechanism 73 is provided on a left side of the conveying mechanism 14 inside the housing 8 (see FIG. 1), and the suction mechanism 74 is provided on a right side of the conveying mechanism 14 inside the housing 8. The suction mechanisms 73 and 74 are bilaterally symmetrical to each other.

Figure 6A:
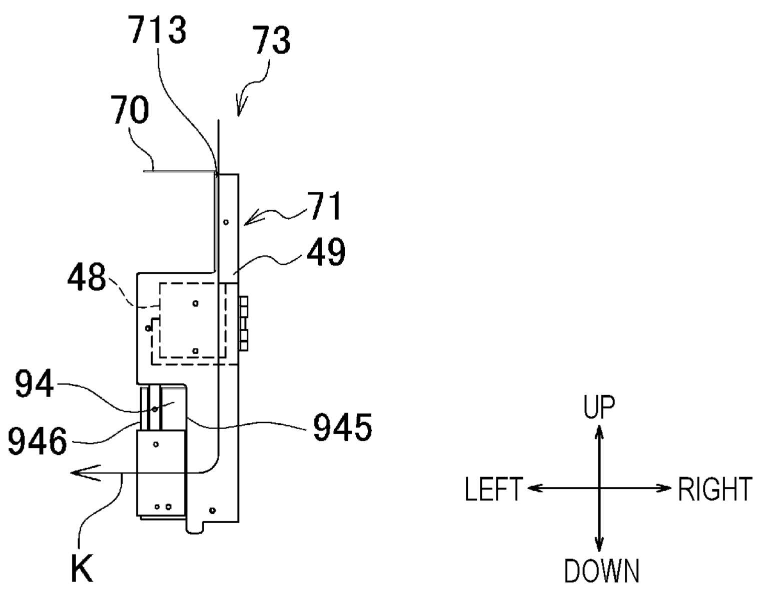
FIG. 6A is a front view of a suction mechanism.
Figure 6B:
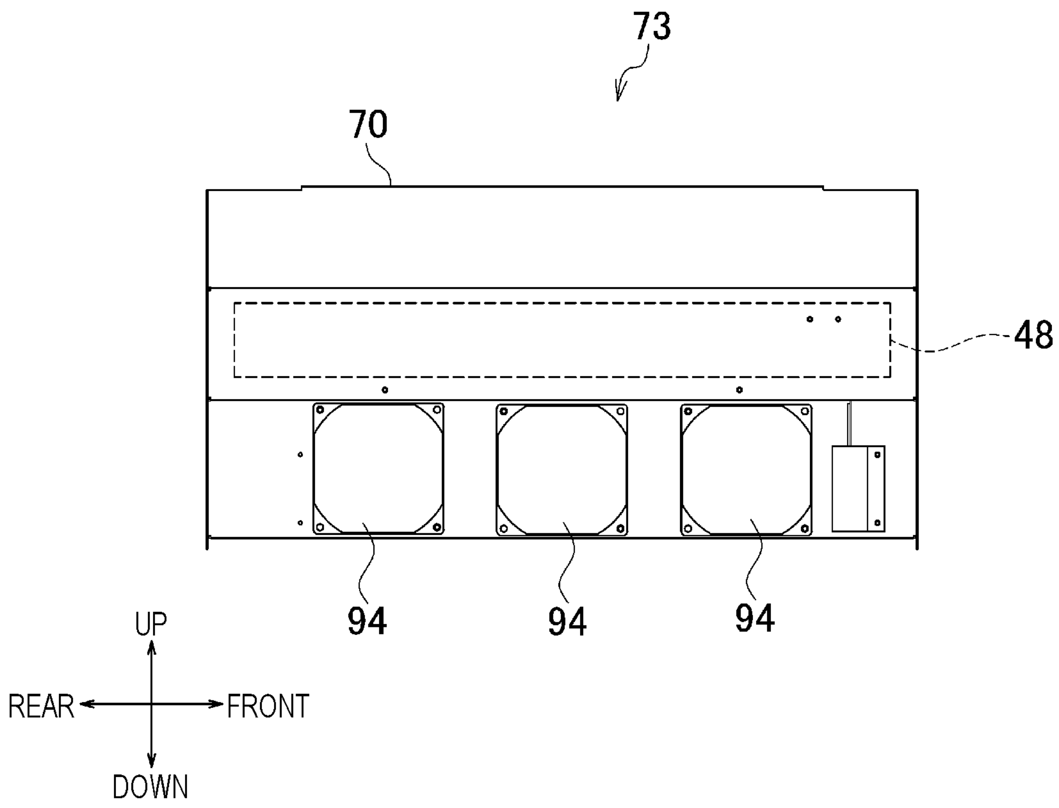
FIG. 6B is a side view of the suction mechanism.

As shown in FIGS. 6A and 6B, the suction mechanism 73 includes the inner wall 71, three fans 94, and a filter unit 48. A slit-shaped suction port 713 elongated in the front-rear direction is formed on an upper surface of the inner wall 71.

As shown in FIG. 6A, the inner wall 71 includes a fixing plate 70 and an accommodating portion 49. The fixing plate 70 is a plate-shaped portion extending in the left-right direction at an upper end of the inner wall 71. As shown in FIG. 4, the fixing plate 70 is fixed to the shaft 57 extending in the front-rear direction. The accommodating portion 49 has a box shape and detachably accommodates the filter unit 48 that has a rectangular parallelepiped shape elongated in the front-rear direction inside the inner wall 71. The filter unit 48 includes a filter and a support configured to support the filter. The filter is, for example, a resin filter having a plurality of minute holes, and is configured to adsorb and collect foreign matter such as mist and dust in the air.

As shown in FIG. 6B, the three fans 94 are provided in a lower portion of a left surface of the inner wall 71. The three fans 94 are disposed at substantially equal intervals in the front-rear direction. As shown in FIG. 4, in the suction mechanism 73, in a case where the fan 94 is driven, the air suctioned into the inner wall 71 from the suction port 713 of the inner wall 71 passes through the filter of the filter unit 48, and the air from which the foreign matter is collected is discharged from a space inside the inner wall 71 from an inlet port 945 via an exhaust port 946 of the fan 94. That is, in a case where the fan 94 is driven, as shown in FIG. 6A, air flows through the space inside the inner wall 71 as indicated by an arrow K.

As shown in FIG. 4, the suction mechanism 74 includes the inner wall 72, three fans (not shown), and a filter unit (not shown) corresponding to the inner wall 71, the three fans 94, and the filter unit 48 of the suction mechanism 73, respectively. A slit-shaped suction port 723 that is elongated in the front-rear direction, and corresponds to the suction port 713 is formed on an upper surface of the suction mechanism 74. In a case where the fan of the suction mechanism 74 is driven, air flows from the suction port 723 to a space inside the inner wall 72. Thereafter, the air passes through the filter of the filter unit as it flows from an upper side to a lower side of the space. Then, the air flows from a lower part of the space to the right where the fan is positioned and is discharged from the space.

The suction mechanisms 73 and 74 may include the inner walls 71 and 72 and the fan 94, respectively, and may not include the filter unit 48.

As shown in FIG. 3, the humidifying mechanism 60 includes two humidified air supply pipes 61 and 62 and a humidifier 66. The humidifier 66 is configured to supply humidified air to the supply port 75 disposed on a left side of the suction mechanism 73, and to the supply port 76 disposed on a right side of the suction mechanism 74. The humidifier 66 is provided inside housing 8 and below the partition plate 29. The humidifier 66 includes a reservoir (not shown), a humidification drive unit 661 (see FIG. 8), an inlet port 69 for taking air into the humidifier 66, two tubes 67 and 68, and fans 662 and 663 (see FIG. 8). The reservoir is configured to store a liquid (for example, water) used for humidification. A water supply pipe may be connected to the reservoir, and water may be supplied to the reservoir from, for example, an external device such as waterworks and a water supply tank (not shown).

The humidification drive unit 661 is configured to humidify the air taken into the humidifier 66 through the inlet port 69 using the liquid stored in the reservoir. The humidification drive unit 661 may be configured to humidify the air by any method such as a steam method, a vaporization method, an ultrasonic method, an electrolysis method, or the like. The tube 67 has one end connected to the humidifier 66, and the other end connected to the supply port 75. The tube 68 has one end connected to the humidifier 66, and the other end connected to the supply port 76.

The fan 662 is configured to supply the air humidified by the humidification drive unit 661 to the supply port 75 via the tube 67 shown in FIG. 3. The fan 663 is configured to supply the air humidified by the humidification drive unit 661 to the supply port 76 via the tube 68 shown in FIG. 3. The humidified air supplied to the supply port 75 is supplied to the support surface 12*a* of the platen 12 through the humidified air supply pipe 61 to be described later. The humidified air supplied to the supply port 76 is also supplied to the support surface 12*a* of the platen 12 through the humidified air supply pipe 62 to be described later. That is, the humidified air supplied from the humidifier 66 is supplied toward the printing medium supported by the platen 12.

As shown in FIG. 4, the two humidified air supply pipes 61 and 62 are fixed to the frame 2. The humidified air supply pipes 61 and 62 are formed of a straight pipe. The two humidified air supply pipes 61 and 62 are disposed around and behind the platen 12 disposed in the print conveying region P3.

The humidified air supply pipe 61 has a humidified air supply port 61*a* at one end, and a pipe (not shown) connected to the supply port 75 is connected to the other end thereof. The humidified air supply pipe 62 has a humidified air supply port 62*a* at one end and a pipe (not shown) connected to the supply port 76 is connected to the other end thereof. More specifically, the pipe connected to the supply port 75 is connected to the humidified air supply pipe 61. The pipe connected to the supply port 76 is connected to the humidified air supply pipe 62.

The two humidified air supply pipes 61 and 62 are disposed inclined with respect to the front-rear direction and the left-right direction such that the humidified air supply ports 61*a* and 62*a* face the support surface 12*a* of the platen 12 located in the print conveying region P3. The two humidified air supply ports 61*a* and 62*a* face forward.

Figure 7:
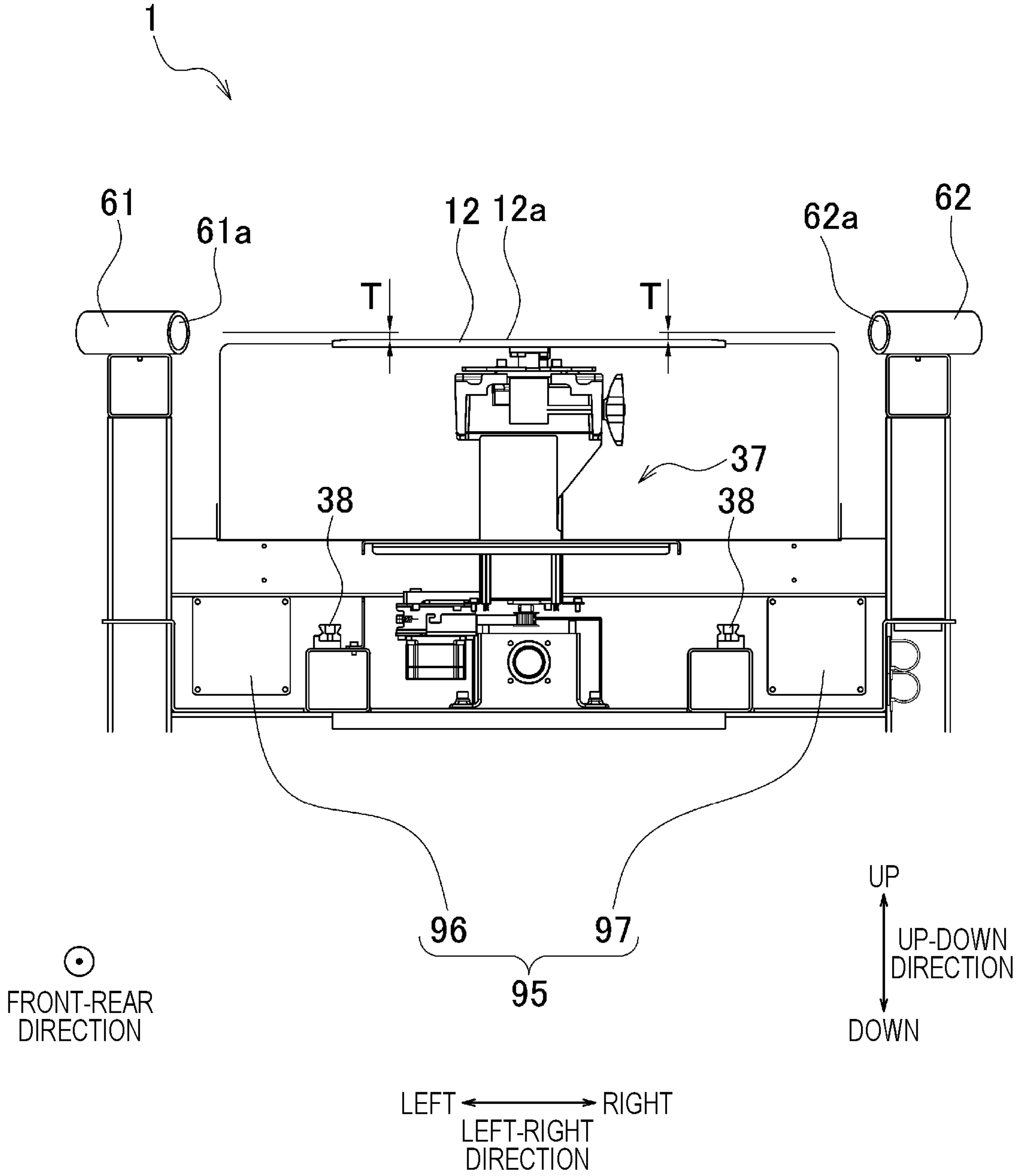
FIG. 7 is a cross-sectional view of a main part taken along line VII-VII of FIG. 4.

As shown in FIG. 7, the two humidified air supply ports 61*a* and 62*a* are disposed at the same position, in the up-down direction. More specifically, the two humidified air supply ports 61*a* and 62*a* are disposed above the platen 12 such that a distance from a central axis (central axis passing through opening center) to the support surface 12*a* of the platen 12 is a predetermined distance T in the up-down direction. The two humidified air supply ports 61*a* and 62*a* open toward a space region (a region between the head 30 and the support surface 12*a* in the up-down direction) above the support surface 12*a* of the platen 12 located in the print conveying region P3.

The humidified air supplied from the two humidified air supply ports 61*a* and 62*a* is supplied, from the vicinity of two rear corners of the platen 12 located in the print conveying region P3, toward the front of the platen 12. As a result, a large amount of humidified air is supplied to the space region between the platen 12 and the head 30 in the up-down direction.

As shown in FIG. 2, the humidity sensor 90 is disposed inside the housing 8. More specifically, the humidity sensor 90 is disposed on a left side of the platen opening 13, and is fixed to a back side of the front surface of the housing 8. The humidity sensor 90 is disposed above the head 30. The humidity sensor 90 is configured to detect the humidity of the inside of the housing 8, and is configured to output a signal indicating the humidity to the controller 80.

As shown in FIG. 3, the air-blowing mechanism 95 includes two fans 96 and 97. The two fans 96 and 97 are disposed outside the pair of rails 38 and inside the pair of inner walls 71 and 72, in the left-right direction. The two fans 96 and 97 are disposed such that centers of the two fans 96 and 97 are positioned slightly below the pair of rails 38 in the up-down direction.

As shown in FIG. 4, the two fans 96 and 97 are fixed to a back side of a rear surface of the housing 8, and in a case where the fans 96 and 97 are driven, air flows from the rear to the front. That is, the air-blowing mechanism 95 is configured to blow the air inside the housing 8 from the rear to the front, and is configured to discharge the air to the outside. The air-blowing mechanism 95 is disposed such that the platen 12 located in the print conveying region P3 is positioned between the platen opening 13 and the air-blowing mechanism 95, in the front-rear direction.

The two fans 96 and 97 are disposed at positions facing the platen opening 13, in the front-rear direction. Therefore, the air supplied by the air-blowing mechanism 95 is effectively discharged from the inside of the housing 8 to the outside through the platen opening 13.

An electrical configuration of the printing device 1 will be described with reference to FIG. 8. The printing device 1 includes the controller 80. The controller 80 includes a CPU 80*a*, a ROM 80*b*, a RAM 80*c*, and a flash memory 80*d*. The CPU 80*a* is configured to control the printing device 1, and is electrically connected to the ROM 80*b*, the RAM 80*c*, and the flash memory 80*d*. The ROM 80*b* is configured to store control programs for the CPU 80*a* to control the operation of the printing device 1, information necessary for the CPU 80*a* to execute various programs, and the like. The ROM 80*b* is configured to store positions of the carriage 6 (head 30) based on, for example, a rotation angle of the horizontal scan motor 99, and is configured to store positions of the platen 12 based on a rotation angle of the vertical scan motor 26. The RAM 80*c* is configured to temporarily store various types of data used in the control programs. The flash memory 80*d* is nonvolatile and is configured to store print data and the like for printing.

Figure 8:
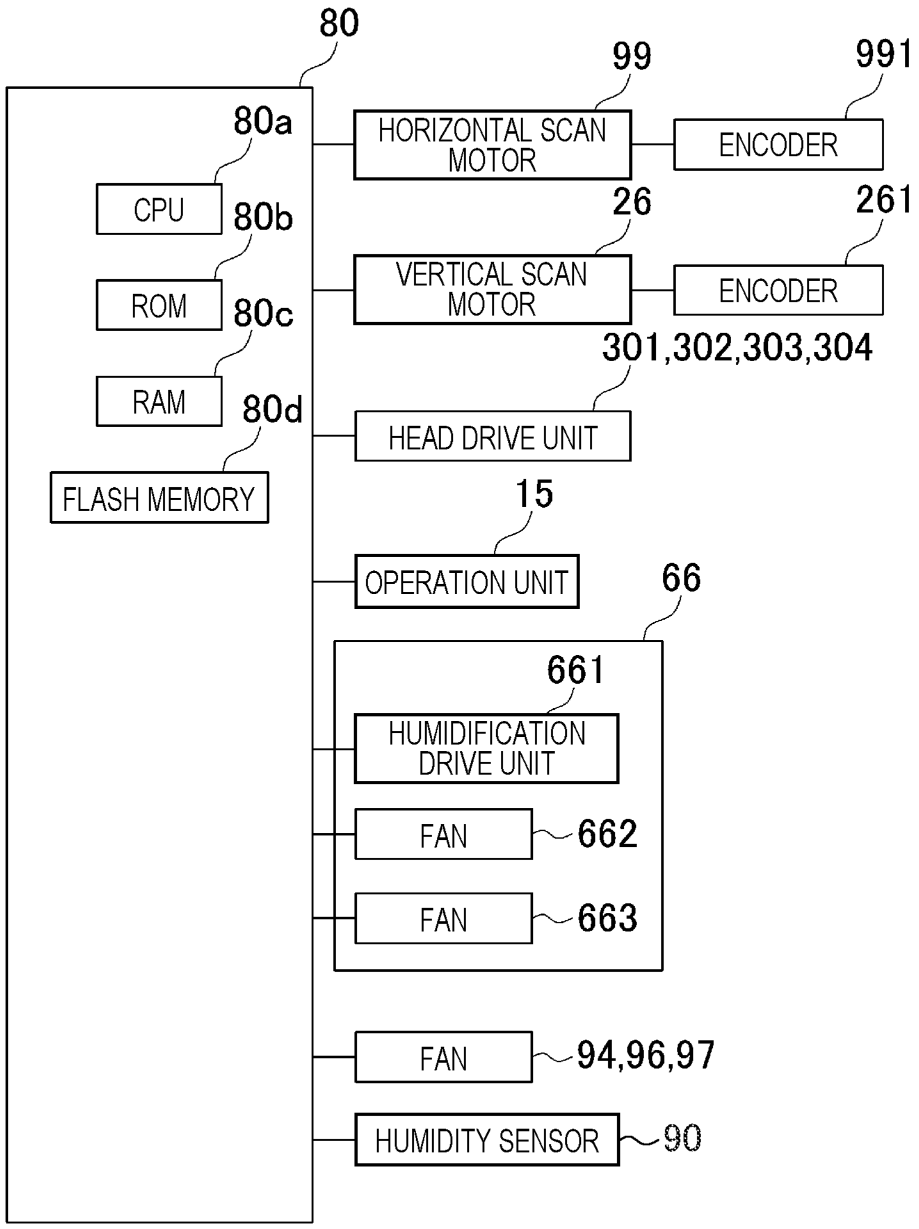
FIG. 8 is a block diagram showing an electrical configuration of the printing device shown in FIG. 1.

As shown in FIG. 8, the horizontal scan motor 99, the vertical scan motor 26, four head drive units 301 to 304, the humidifier 66, the humidity sensor 90, the three fans 94, 96, and 97, and the operation unit 15 are electrically connected to the controller 80. The horizontal scan motor 99, the vertical scan motor 26, the head drive units 301 to 304, the humidifier 66, and the three fans 94, 96, and 97 are driven under the control by the controller 80.

The horizontal scan motor 99 and the vertical scan motor 26 are provided with encoders 991 and 261, respectively. The encoder 991 is configured to detect the rotation angle of the horizontal scan motor 99, and is configured to output a detection result to the controller 80. The encoder 261 is configured to detect the rotation angle of the vertical scan motor 26, and is configured to output a detection result to the controller 80.

The four head drive units 301 to 304 correspond to the white heads 31 and 32 and the color heads 33 and 34 in order, and are included in the heads 31 to 34. Each of the head drive units 301 to 304 includes a plurality of drive elements (piezoelectric elements or heating elements) configured to selectively apply energy to the ink in a plurality of individual flow paths respectively communicating with the plurality of nozzles of the head 30. The head drive units 301 to 304 is configured to apply energy to the ink in the white heads 31 and 32 and the color heads 33 and 34 by driving the white heads 31 and 32 and the color heads 33 and 34 respectively, and thus the ink is selectively ejected from the corresponding nozzles 313, 323, 333 and 343.

<Control During Printing>

Figure 9:
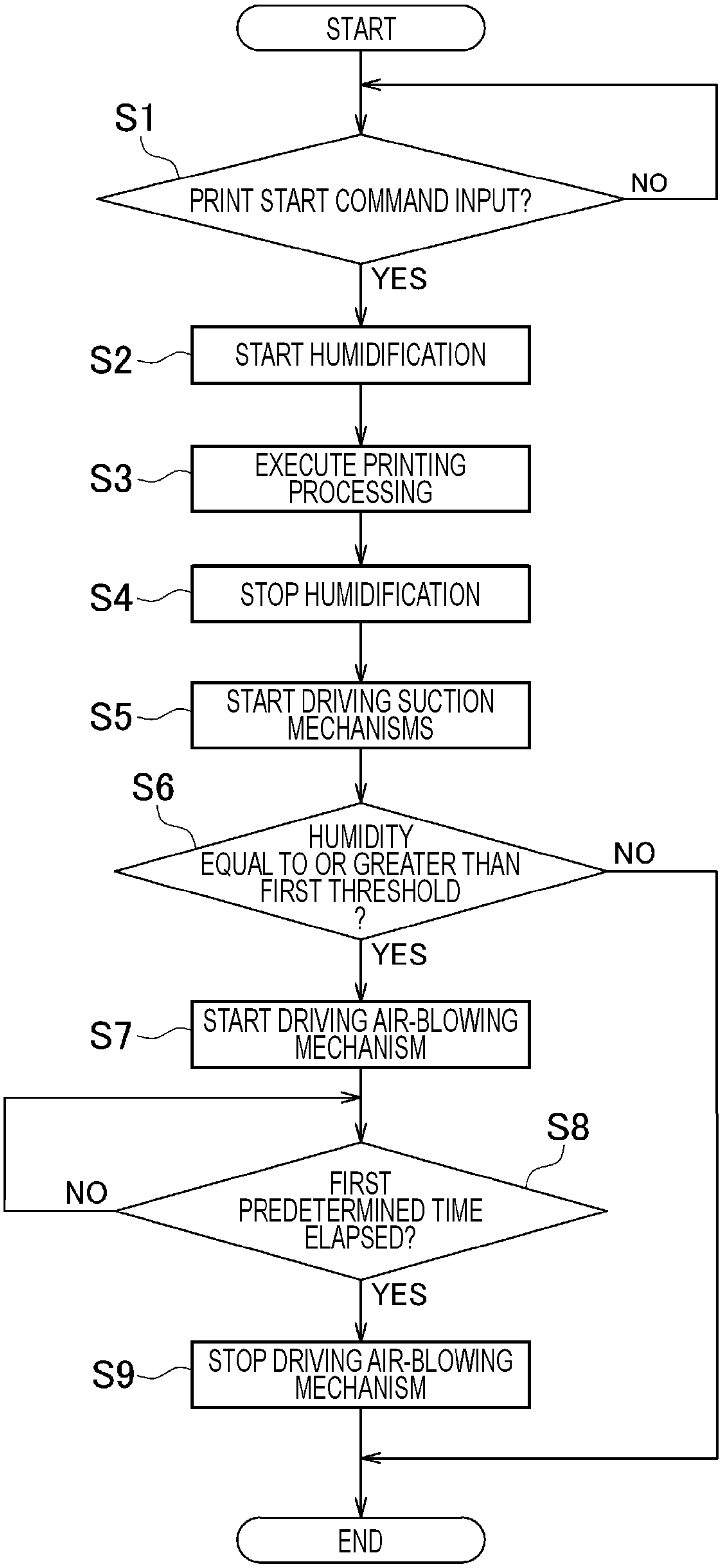
FIG. 9 is a flowchart showing an example of a processing procedure performed when a print start command is input to the printing device shown in FIG. 1.

The control by the controller 80 when printing an image on a printing medium will be described with reference to FIG. 9. In a case where a user operates the operation unit 15 and inputs a print start command to the printing device 1, the controller 80 is configured to read a control program from the ROM 80*b* and execute the flow of FIG. 9. Hereinafter, the flow of FIG. 9 will be described.

First, the controller 80 determines whether a print start command is input (step S1). The user applies a pretreatment liquid to a printing medium, before operating the operation unit 15 to input the print start command. The pretreatment liquid may be applied from an application mechanism such as a spray or a head provided separately from the printing device 1, in response to input of the print start command. The printing medium (T-shirt) is placed on the support surface 12*a* of the platen 12, before a volatile component of the pretreatment liquid applied to the printing medium is completely volatilized. That is, the printing medium on which the pretreatment liquid is applied can be immediately placed on the platen 12 without particular special treatment such as drying. In the present embodiment, when step S1 is processed, the printing medium immediately after the pretreatment liquid is applied is supported by the platen 12. Therefore, during the printing processing to be described later, the organic acid volatilizes from the pretreatment liquid applied to the printing medium. The platen 12 is located at the setting position P1 during non-printing. In the printing device 1, during non-printing, the head 30 is normally disposed at the maintenance position B1, and the plurality of nozzles of the head 30 are capped by a cap of a maintenance unit (not shown).

When the print start command is not input (step S1: NO), step S1 is repeated until the print start command is input. On the other hand, when the print start command is input (step S1: YES), the controller 80 is configured to control the humidifier 66 such that the supply of humidified air is started from the two humidified air supply ports 61*a* and 62*a* (step S2). That is, the controller 80 is configured to drive the humidification drive unit 661 to generate humidified air. Then, the fans 662 and 663 are driven to supply humidified air from the two humidified air supply ports 61*a* and 62*a*. The humidified air is supplied from the two humidified air supply ports 61*a* and 62*a*, and as a result, the humidified air is supplied to the print conveying region P3.

Figure 10A:
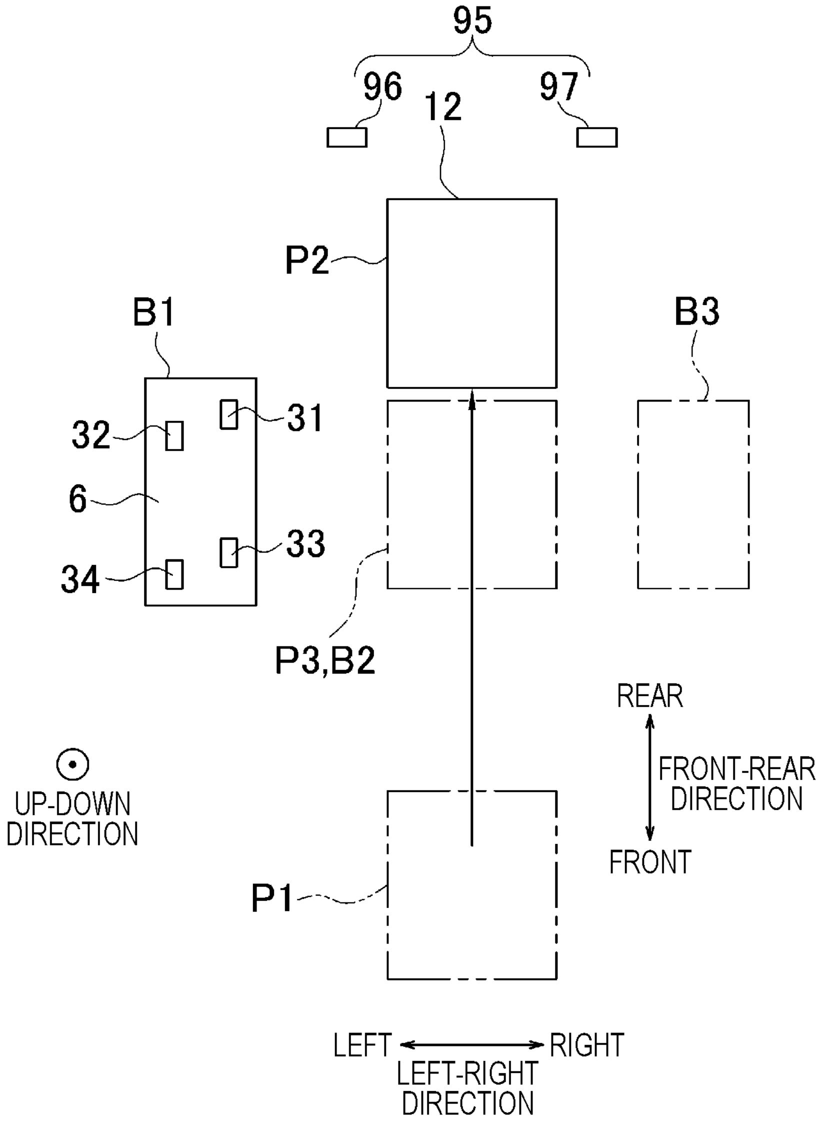
FIG. 10A is a diagram showing a situation in which a platen is conveyed from a setting position to a pre-printing standby position.

Next, the controller 80 is configured to perform printing processing of printing an image on the printing medium (step S3). As shown in FIG. 10A, the controller 80 is configured to control the vertical scan motor 26 based on a detection result from the encoder 261 to move the platen 12 from the setting position P1 to the pre-printing standby position P2, through the print conveying region P3. Thereafter, the controller 80 is configured to control the vertical scan motor 26 based on the detection result from the encoder 261 to move the platen 12 from the pre-printing standby position P2 to the print conveying region P3.

Then, the controller 80 is configured to control the horizontal scan motor 99 based on a detection result from the encoder 991 to move the carriage 6 from the maintenance position B1 to the ejection region B2, and is configured to cause the head 30 to face the printing medium placed on the platen 12.

To perform printing on the printing medium, the controller 80 is configured to control the head drive units 301 to 304, the horizontal scan motor 99, and the vertical scan motor 26, and to alternately repeat ejection scan and forward movement of the platen 12, in a state where at least a part of the platen 12 is positioned in the print conveying region P3 and in a state where the carriage 6 is positioned in the ejection region B2. That is, at the time of printing on the printing medium, since the platen 12 is conveyed forward from the pre-printing standby position P2 to the print conveying region P3, first, the ink is ejected from the nozzles of the white heads 31 and 32 onto the printing medium on which the pretreatment liquid is applied, and a base is formed. Then, after the platen 12 passes through the white heads 31 and 32, the ink is ejected from the nozzles of the color heads 33 and 34 onto the base formed on the printing medium, and an image is formed. A white portion of the image is a base portion formed with the white ink. Therefore, the color ink is not ejected onto the base portion corresponding to a white portion of the image.

Since the humidified air is supplied from the two humidified air supply ports 61*a* and 62*a* before the printing processing is performed, the humidified air is supplied onto the printing medium in a case where the platen 12 passes under the head 30 or in a case where printing is performed on the printing medium. That is, a humidified air layer exists on the printing medium. Therefore, the volatile component of the pretreatment liquid applied to the printing medium is less likely to volatilize. Even in a case where the volatile component of the pretreatment liquid volatilizes, the volatile component is less likely to reach the inside of the nozzles of the head 30 facing the printing medium.

Next, in a case where the printing on the printing medium based on print data is completed (printing processing is completed), the controller 80 is configured to control the humidifier 66 to stop the supply of the humidified air from the two humidified air supply ports 61*a* and 62*a* (step S4). That is, the controller 80 is configured to stop the driving of the humidification drive unit 661 to stop generating humidified air. Then, the driving of the fans 662 and 663 is stopped, and the supply of humidified air from the two humidified air supply ports 61*a* and 62*a* is stopped.

Figure 10B:
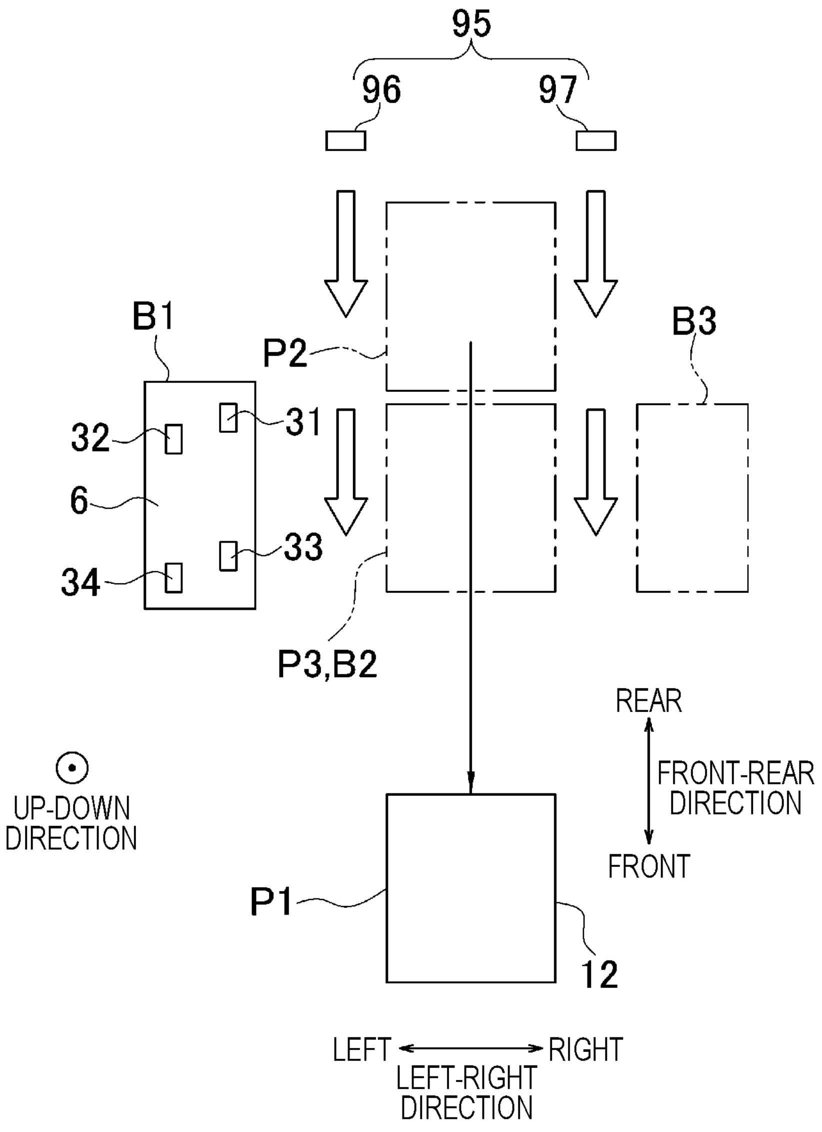
FIG. 10B is a diagram showing a situation in which the platen is conveyed from the pre-printing standby position to the setting position.

Thereafter, as shown in FIG. 10B, the controller 80 is configured to control the vertical scan motor 26, based on the detection result from the encoder 261, to stop the platen 12 at the setting position P1. The user removes the printing medium on which an image is formed, from the platen 12 located at the setting position P1. At this time, the controller 80 is configured to control the horizontal scan motor 99, based on the detection result from the encoder 991, to move the carriage 6 leftward from the ejection region B2 and stop the carriage 6 at the maintenance position B1.

The controller 80 is configured to start driving the fans 94 of the suction mechanisms 73 and 74, in a case where printing on the printing medium based on the print data is completed, that is, in a case where a color ink ejection period during which the color ink is ejected onto the printing medium ends (step S5). As a result, an airflow is formed from the print conveying region P3, the ejection region B2, and spaces in the vicinity of these regions to the suction ports 713 and 723. As a result, foreign matter such as ink mist and dust in the air can be adsorbed and collected by the filter unit 48. Since the suction mechanisms 73 and 74 are driven after the color ink ejection period ends, it is possible to prevent the airflow generated by driving the suction mechanisms 73 and 74 from affecting the impact accuracy of the ink to the printing medium. The controller 80 is configured to stop driving the fans 94 of the suction mechanisms 73 and 74, after a predetermined time has elapsed.

Next, the controller 80 is configured to determine whether the humidity detected by the humidity sensor 90 is equal to or greater than a first threshold (step S6). In the present embodiment, step S6 is performed after step S5, but step S6 may be performed before step S5. That is, the controller 80 may be configured to perform step S6, when the color ink ejection period in the printing processing ends. The first threshold is stored in the flash memory 80*d*. The first threshold is a boundary value of humidity at which dew condensation is likely to occur in the housing 8 in a state where the driving of the humidifying mechanism 60 is stopped. The first threshold in the present embodiment is 70%, but may be appropriately changed according to the surrounding environment. In a case where the humidity is less than the first threshold (step S6: NO), the controller 80 is configured to determine that the humidity inside the housing 8 is low, the fans 96 and 97 of the air-blowing mechanism 95 are not driven, and the flow for printing ends.

On the other hand, when the humidity is equal to or greater than the first threshold (step S6: YES), the controller 80 starts driving the fans 96 and 97 of the air-blowing mechanism 95 (step S7). As a result, as shown in FIG. 10B, the two fans 96 and 97 generate an airflow (indicated by white arrows as illustrated) from the rear to the front inside the housing 8. Therefore, the air inside the housing 8 is discharged to the outside through the platen opening 13, and the humidity inside the housing 8 decreases. In the present embodiment, during the ejection period in the printing processing (ejection period of the white ink and the color ink), the driving of the air-blowing mechanism 95 is stopped. Therefore, the air-blowing amount by the air-blowing mechanism 95 during the ejection period is zero. On the other hand, when the air-blowing mechanism 95 is driven in step S7, the air-blowing amount becomes the desired amount (a value larger than zero), and the air-blowing amount by the air-blowing mechanism 95 after the ejection period becomes larger than the air-blowing amount by the air-blowing mechanism 95 during the ejection period.

The controller 80 is configured to determine whether a first predetermined time has elapsed after starting driving the fans 96 and 97 (step S8). When the first predetermined time has not elapsed (step S8: NO), step S8 is repeated. The first predetermined time is set to a period of time until the humidity inside the housing 8 is less than the first threshold even in a case where the humidity is equal to or greater than the first threshold by driving the air-blowing mechanism 95. On the other hand, when the first predetermined time has elapsed (step S8: YES), the controller 80 stops driving the fans 96 and 97 of the air-blowing mechanism 95 (step S9). Thus, the flow for printing ends.

As a modification, in step S8, the controller 80 may be configured to determine whether the humidity detected by the humidity sensor 90 is less than the first threshold, to repeat step S8 in a case where the humidity is equal to or greater than the first threshold, and to stop driving the fans 96 and 97 of the air-blowing mechanism 95 in a case where the humidity is less than the first threshold.

As another modification, the controller 80 may be configured to perform the processing of step S5 after the processing of step S9 is performed. That is, step S5 may be performed after the humidity detected by the humidity sensor 90 becomes less than the first threshold.

As described above, according to the printing device 1 of the present embodiment, since humidified air can be supplied to the inside of the housing 8, the volatile component of the pretreatment liquid applied to the printing medium is less likely to volatilize, and the volatile component of the pretreatment liquid is less likely to reach the nozzles of the head 30. Therefore, it is possible to prevent a failure due to the reaction between the ink in the nozzles and the volatile component of the pretreatment liquid. By driving the air-blowing mechanism 95, the humidified air inside the housing 8 supplied by the humidifying mechanism 60 can be discharged to the outside of the housing 8. Therefore, it is possible to prevent dew condensation from occurring inside the housing 8. For example, if dew condensation occurs on the encoders 261, 991, or the like inside the housing 8, the detection accuracy decreases, and the printing device malfunctions. In the present embodiment, it is possible to prevent dew condensation from occurring inside the housing 8, and thus it is possible to prevent the printing device 1 from malfunctioning.

The controller 80 is configured to start driving the air-blowing mechanism 95 after stopping the driving of the humidifying mechanism 60. As a result, it is possible to effectively reduce the humidity inside the housing 8.

In step S7, the controller 80 is configured to control the air-blowing mechanism 95 such that the air-blowing amount by the air-blowing mechanism 95 after the color ink ejection period, during which the color ink is ejected onto the printing medium to perform the printing processing, is larger than the air-blowing amount by the air-blowing mechanism 95 during the ejection period. As a result, it is possible to reduce the air-blowing amount by the air-blowing mechanism 95 during the color ink ejection period, and it is possible to prevent a decrease in the impact accuracy of the color ink on the printing medium during the printing processing.

In step S3, the controller 80 is configured to stop driving the air-blowing mechanism 95 and to drive the humidifying mechanism 60 during the color ink ejection period in the printing processing. As a result, during the color ink ejection period, the humidified air supplied to the inside of the housing 8 is not discharged to the outside of the housing 8. Therefore, in the ejection period, the humidified air is easily supplied between the head 30 and the printing medium, and it is possible to further prevent a failure due to the reaction between the ink in the nozzles and the volatile component of the pretreatment liquid. It is possible to prevent the impact accuracy of the ink on the printing medium from deteriorating due to the air blowing of the air-blowing mechanism 95.

The controller 80 is configured to drive the air-blowing mechanism 95 by proceeding from step S6 to step S7, and configured not to drive the air-blowing mechanism 95 in a case where the humidity is less than the first threshold in step S6. As a result, it is possible to effectively prevent the humidity inside the housing 8 from becoming equal to or greater than the first threshold. That is, in a case where the first threshold is, for example, a high humidity of 70%, it is possible to prevent the inside of the housing 8 from being maintained in high-humidity environment, and dew condensation is less likely to occur inside the housing 8.

The air-blowing mechanism 95 is configured to blow air from the inside of the housing 8 toward the outside of the housing 8 through the platen opening 13. As a result, it is possible to discharge humidified air inside the housing 8 to the outside of the housing 8, using the platen opening 13 through which the platen 12 moves between the inside and the outside of the housing 8. Therefore, it is not necessary to provide another opening in the housing 8 for discharging the humidified air.

The platen 12 located in the print conveying region P3 is positioned between the air-blowing mechanism 95 and the platen opening 13. As a result, it is possible to effectively discharge, from the platen opening 13, the humidified air existing around the platen 12 located in the print conveying region P3.

Figure 11:
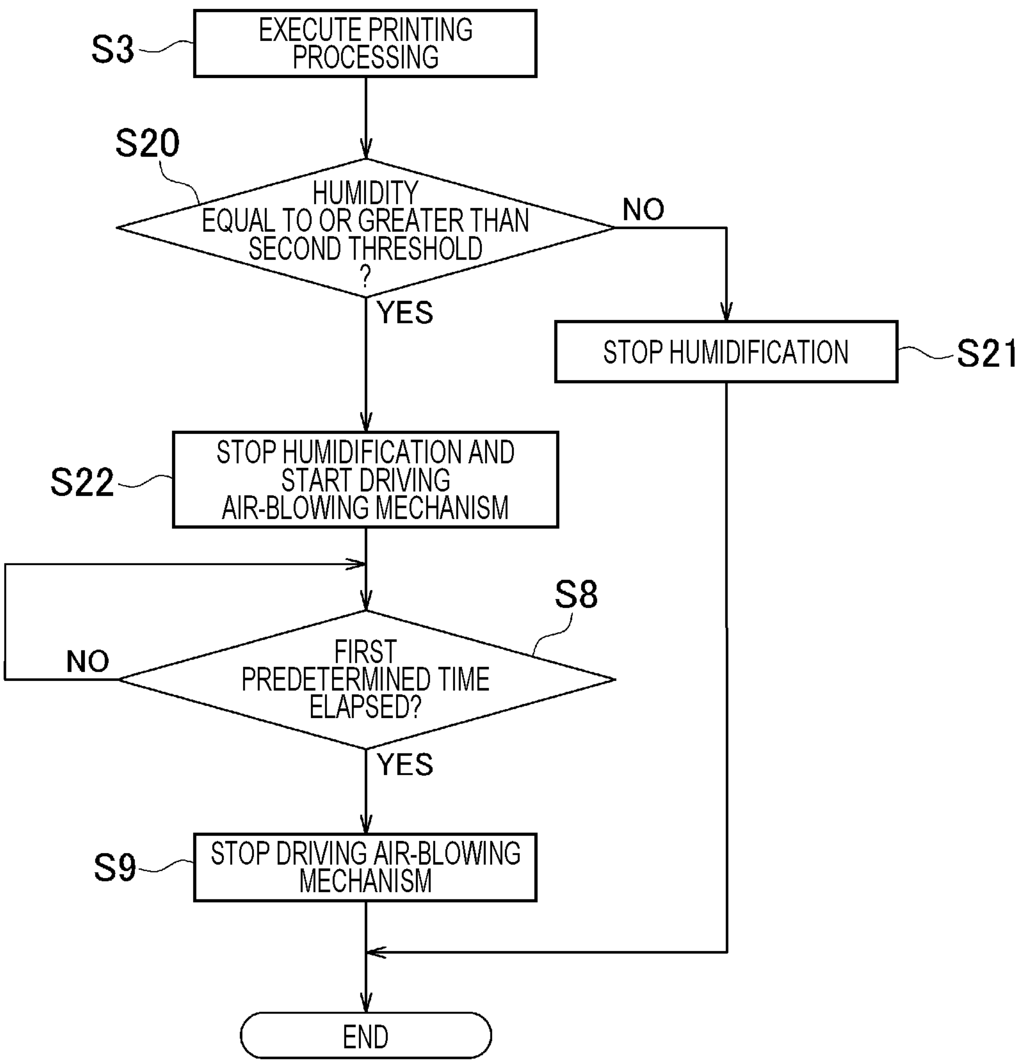
FIG. 11 is a flowchart showing a part of a processing procedure performed when a print start command is input to a printing device.

In the embodiment described above, the controller 80 is configured to control the humidifying mechanism 60 to stop the supply of the humidified air in step S4, but the control as shown in FIG. 11 may be performed. In the present modification, the controller 80 is configured to determine whether the humidity detected by the humidity sensor 90 is equal to or greater than a second threshold, after the printing processing of step S3 (step S20). The second threshold is stored in the flash memory 80*d*. The second threshold is equal to or greater than the first threshold, and is the humidity at which dew condensation is likely to occur in the housing 8 in a state where the driving of the humidifying mechanism 60 is stopped, which is similar to the first threshold. The second threshold in the present modification is 75%, but may be changed as appropriate. In a case where the humidity is less than the second threshold (step S20: NO), the controller 80 is configured to determine that the humidity inside the housing 8 is low, and to control the humidifier 66 in the same manner as in step S4 described above without driving the fans 96 and 97 of the air-blowing mechanism 95 (step S21).

On the other hand, when the humidity is equal to or greater than the second threshold (step S20: YES), the controller 80 is configured to control the humidifier 66 in the same manner as in step S4 described above, and to start driving the fans 96 and 97 of the air-blowing mechanism 95 (step S22). As a result, it is possible to more effectively prevent the humidity inside the housing 8 from becoming equal to or greater than the second threshold, and dew condensation is much less likely to occur inside the housing 8. Thereafter, the same processing as step S8 and step S9 described above is performed, and the flow ends. In the printing device 1 according to such a modification, the same effects as those of the embodiment described above can also be obtained.

In the above modification, the processing proceeds from step S3 to step S20, and in the case of YES in step S20, the processing proceeds to step S22, but step S6 may be performed between step S3 and step S20. In step S6, in the case of NO, the processing proceeds to step S21, and in the case of YES, the processing proceeds to step S7. Then, the processing may proceed from step S7 to step S20. In this case, as described above, dew condensation is less likely to occur inside the housing 8.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the embodiment and the modifications described above, the air-blowing mechanism 95 is provided at the rear of the housing 8, but the air-blowing mechanism may be provided anywhere in the housing 8 as long as air can be blown from the inside of the housing 8 toward the outside. The air-blowing mechanism may include one or three or more fans. The air supplied by the air-blowing mechanism 95 may be discharged from the inside of the housing 8 to the outside through an opening other than the platen opening 13.

In the embodiment and modifications described above, step S7 is performed after step S2 is performed, but the air-blowing mechanism 95 may be driven at least after the humidifying mechanism 60 (humidifier 66) is driven. That is, the air-blowing mechanism 95 may be driven with an air-blowing amount smaller than the air-blowing amount by the air-blowing mechanism 95 in step S7 before S2 is performed, or may be driven with an air-blowing amount smaller than the air-blowing amount by the air-blowing mechanism 95 in step S7 after step S2 and before step S3. In a case where the air-blowing amount is small, the supplied humidified air effectively flows from the rear to the front of the platen 12, and a humidified air layer can be formed between the printing medium and the head 30. The driving of the air-blowing mechanism 95 may be stopped in step S9. That is, in a case where the air-blowing amount is small, the impact accuracy of the ink ejected from the head 30 is not affected, and thus the air-blowing mechanism 95 may be driven in step S3.

The second threshold described above is larger than the first threshold, but may be the same as the first threshold.

Between the white heads 31 and 32 and the color heads 33 and 34 of the carriage 6, an overcoat head configured to eject a post-treatment liquid for overcoating an image formed on the printing medium may be provided. In this case, after the ejection of the color ink onto the printing medium is completed and an image is formed (when the printing processing is completed), the platen 12 is returned to the pre-printing standby position P2 again. Then, the platen 12 is conveyed to the print conveying region P3, and the post-treatment liquid is ejected onto the printing medium from the overcoat head. Thus, the image on the printing medium can be overcoated. In such a printing device as well, as in the case of the embodiment and the modifications described above, the air-blowing mechanism 95 is driven in step S7 when the printing processing in which the ejection of the color ink is completed, and thus dew condensation is less likely to occur inside the housing 8. The air-blowing mechanism 95 may be driven with the air-blowing amount in step S7, during the period in which the post-treatment liquid is ejected onto the printing medium. In a case where the air-blowing amount is small, since the impact accuracy is not affected, the air-blowing mechanism 95 may be driven during the ejection period of the post-treatment liquid.

In the embodiment described above, the humidified air supplied from the humidifier 66 to the supply ports 75 and 76 is supplied to the two humidified air supply pipes 61 and 62, but the humidified air supplied to the supply ports 75 and 76 may be directly supplied to the inside of the housing 8 from the supply ports 75 and 76. That is, the two humidified air supply pipes 61 and 62 may not be provided. In this case as well, by humidifying the inside of the housing 8, the volatile component of the pretreatment liquid applied to the printing medium is less likely to volatilize. Therefore, it is possible to prevent a failure due to the reaction between the ink in the nozzles and the volatile component of the pretreatment liquid. In this case as well, by performing step S7 described above, it is possible to discharge the humidified air inside the housing 8 to the outside of the housing 8. Therefore, it is possible to prevent dew condensation from occurring inside the housing 8. By connecting the humidifier 66 and the two humidified air supply pipes 61 and 62 in a separate path, the humidified air may be supplied from the two humidified air supply pipes 61 and 62 as described above. Alternatively, by providing a humidifier separate from the humidifier 66 and by connecting the separate humidifier and the two humidified air supply pipes 61 and 62 via a piping member such as a tube, the humidified air may be supplied from the supply ports 75 and 76 and the two humidified air supply pipes 61 and 62. This makes it easier to effectively form the humidified air layer on the printing medium. Therefore, the volatile component of the pretreatment liquid applied to the printing medium is much less likely to volatilize. Even if the volatile component of the pretreatment liquid volatilizes, the volatile component is much less likely to reach the inside of the nozzles of the head 30 facing the printing medium. In any of the modifications, the humidifier 66 may be controlled in the same manner as described above and in the modifications. The humidifying mechanism 60 may have any configuration as long as the humidified air can be supplied to the inside of the housing 8.

In a case where another print start command is input to the printing device 1 in a period from the driving of the air-blowing mechanism 95 is started in step S7 described above until the first predetermined time has elapsed or until the humidity detected by the humidity sensor 90 becomes less than the first threshold, the driving of the air-blowing mechanism 95 may be stopped and step S2 may be performed.

In the embodiment described above, the humidity sensor 90 is disposed on the left side of the platen opening 13, but a plurality of humidity sensors 90 may be provided inside the housing 8. In this case, in a case where any of the humidity sensors 90 detects the humidity equal to or greater than the first threshold, the air-blowing mechanism 95 driven in step S7 may continue to be driven. The humidity sensor 90 may not be provided, and the processing of step S6 and step S20 may not be performed. In this case, step S7 and step S22 may be performed, after step S2 is executed. In this case as well, it is possible to reduce the humidity inside the housing 8, and dew condensation is less likely to occur inside the housing 8.

The head 30 in the embodiment and the modifications described above have been described as an example in which the present disclosure is applied to a printing device including a serial head configured to eject ink from a plurality of nozzles while moving in the horizontal scan direction (left-right direction) by the moving mechanism 77, but the present invention is not limited thereto. For example, the present disclosure can also be applied to a printing device including a line head extending over the entire length of the printing medium (platen 12) in the horizontal scan direction, and disposed not to be movable in the ejection region B2.

The printing devices according to the embodiment and the modifications described above may include a pretreatment liquid application mechanism for applying a pretreatment liquid to a printing medium. In this case, the pretreatment liquid may be applied to the printing medium by the pretreatment liquid application mechanism before the printing processing is performed. In step S1 described above, after the print start command is input, the pretreatment liquid may be applied to the printing medium by the pretreatment liquid application mechanism.

In the controller 80 in the embodiment and modifications described above, a microcomputer, an application specific integrated circuit (ASIC), a field programmable gate array (FPGA), or the like may be used as a processor, instead of the CPU 80*a*. In this case, the main processing may be distributed by a plurality of processors. A non-transitory storage medium such as the ROM 80*b* and the flash memory 80*d* may be any storage medium configured to store information regardless of the period during which the information is stored. The non-transitory storage medium may not include a temporary storage medium (for example, a transmitted signal). Control programs may be downloaded (that is, transmitted as a transmission signal) from a server connected to a network (not shown) and stored in the ROM 80*b* or the flash memory 80*d*. In this case, the control programs may be stored in a non-transitory storage medium such as an HDD provided in the server. In the embodiment and modifications described above, the volatile component of the pretreatment liquid contains an organic acid, but the present invention is not limited thereto. That is, the volatile component of the pretreatment liquid may include a component other than the organic acid, which reacts with the ink in the nozzles to cause aggregation or discoloration.

What is claimed is:

1. A printing device comprising:
a head including a nozzle configured to eject ink;
a housing in which the head is disposed;
a platen configured to support a printing medium applied with a pretreatment liquid, the pretreatment liquid containing a volatile component that reacts with the ink;
a humidifying mechanism configured to supply humidified air to inside of the housing;
an air-blowing mechanism configured to blow air from the inside of the housing toward outside of the housing; and
a controller configured to control the humidifying mechanism and the air-blowing mechanism,
wherein the controller is configured to drive the air-blowing mechanism, at least after driving the humidifying mechanism.

2. The printing device according to claim 1,
wherein the controller is configured to start driving the air-blowing mechanism, after stopping driving the humidifying mechanism.

3. The printing device according to claim 1,
wherein the head is configured to eject color ink from the nozzle, and
the controller is configured to control the air-blowing mechanism such that an air-blowing amount by the air-blowing mechanism after an ejection period is larger than an air-blowing amount by the air-blowing mechanism during the ejection period, the ejection period being a period in which the color ink is ejected from the nozzle onto a printing medium to perform printing.

4. The printing device according to claim 3,
wherein, during the ejection period, the controller is configured to:
stop driving the air-blowing mechanism; and
drive the humidifying mechanism.

5. The printing device according to claim 1, further comprising:
a humidity sensor configured to detect humidity inside the housing,
wherein, in a case where the humidity detected by the humidity sensor is equal to or greater than a first threshold, the controller is configured to drive the air-blowing mechanism, and
wherein, in a case where the humidity detected by the humidity sensor is less than the first threshold, the controller is configured not to drive the air-blowing mechanism.

6. The printing device according to claim 5,
wherein, in a case where the humidity detected by the humidity sensor is equal to or greater than a second threshold, the controller is configured to drive the air-blowing mechanism and configured to stop driving the humidifying mechanism, the second threshold being equal to or greater than the first threshold.

7. The printing device according to claim 1,
wherein the platen is configured to be moved between the inside and the outside of the housing, through an opening provided in the housing, and
the air-blowing mechanism is configured to blow air from the inside of the housing toward the outside of the housing, through the opening.

8. The printing device according to claim 7,
wherein the platen at a printing position facing the nozzle is located between the air-blowing mechanism and the opening, in a direction from the air-blowing mechanism toward the opening.

* * * * *